Nov. 2, 1954

V. H. MEYER 2,693,253

BRAKE SYSTEM FOR VEHICLES

Filed May 21, 1953

*Inventor*
Vernon H. Meyer
By his Attorney

Nov. 2, 1954  V. H. MEYER  2,693,253
BRAKE SYSTEM FOR VEHICLES
Filed May 21, 1953  3 Sheets-Sheet 2
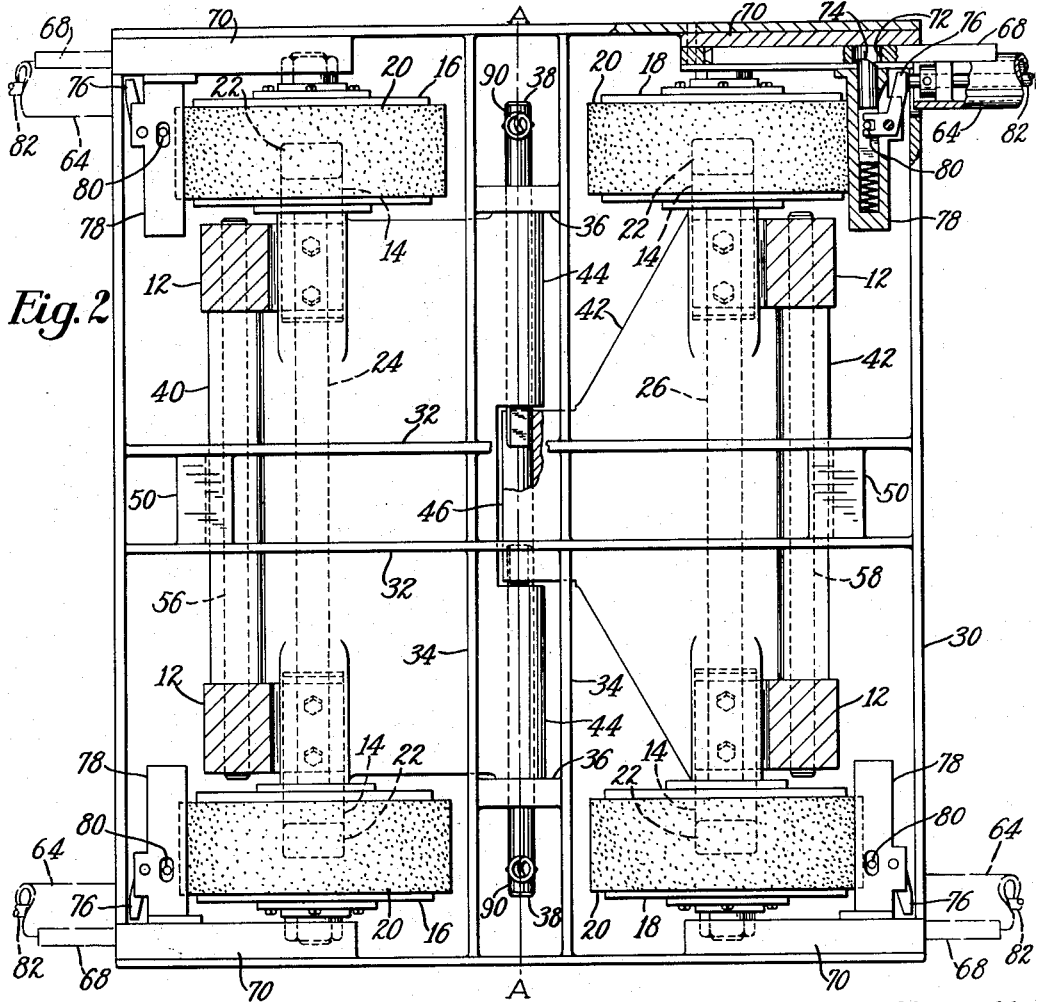
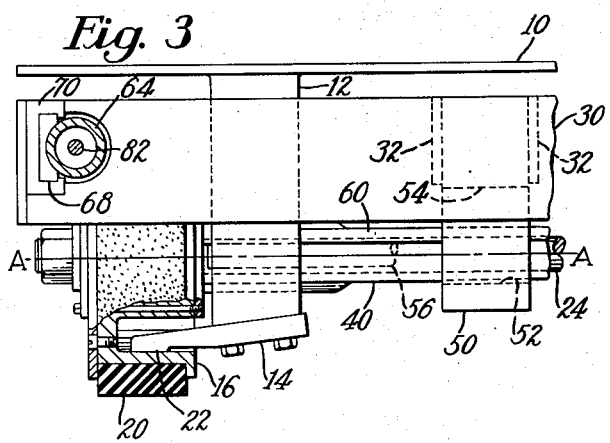
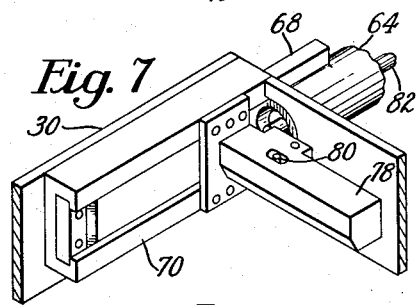
*Inventor*
Vernon H. Meyer
By his Attorney Nov. 2, 1954  V. H. MEYER  2,693,253
BRAKE SYSTEM FOR VEHICLES
Filed May 21, 1953  3 Sheets-Sheet 3

Inventor
Vernon H. Meyer
By his Attorney

United States Patent Office 2,693,253
Patented Nov. 2, 1954

2,693,253

BRAKE SYSTEM FOR VEHICLES

Vernon H. Meyer, Beverly, Mass., assignor to United Shoe Machinery Corporation, Flemington, N. J., a corporation of New Jersey Application May 21, 1953, Serial No. 356,465

8 Claims. (Cl. 188—119)

This invention relates to means for operating the brakes of a conveyance. More especially the invention is concerned with the provision of control mechanism of a type which may be manually operated for moving braking devices to and from effective relation with the wheels of a vehicle. The invention is herein illustrated as embodied in a four-wheeled vehicle having shoes disposed automatically to assume frictional braking relation with respect to each of the wheels immediately upon manual release of a control member by which the vehicle is normally moved and steered. It will be recognized, however, that in several important aspects the invention is not limited in use to hand-controlled vehicles of the particular construction illustrated or to hand-controlled brakes, and moreover may, with slight modification, be advantageously applied to motor powered vehicles or power actuated brakes.

When carts or trucks, or the like, are heavily loaded it usually is highly essential that their motion be promptly brought under control or, if stopped, that they remain immobile until control is asserted. To this end earlier developments have utilized the weight of the load carried to assure that a brake device would be operated upon reduction or cessation of tractive power to retard or maintain stopped the vehicle supporting the load. Organizations of this type have usually been fairly satisfactory though they have at times been cumbersome in operation or, as in some instances, required the load-supporting body to tilt undesirably when the brakes were either in operative or inoperative position. A primary object of this invention, therefore, is to provide a novel and improved vehicle control system in which use is made of the tendency of the load being hauled automatically to apply the brakes of the vehicle to bring it to rest or maintain it in rest condition and that will, in addition, afford simple, reliable means by which the brakes may, with facility, be released from cooperation with the wheels of the vehicle while control of its movement is continuously exercised.

In accordance with the object just stated, a feature of the invention resides in the combination, in a vehicle having load-supporting legs provided with brake shoes respectively cooperative with the axle-mounted wheels on which the vehicle travels, of a first lever pivotally mounted on an axle and connected at one end to a load-supporting leg, a second lever pivotally mounted on another axle and connected at one end to another load-supporting leg, said levers being connected at their other ends in equalizer formation, a tiltable member by which said other ends of the levers are pivotally supported, and means for tilting said member to actuate said equalizer formation and thereby force said supporting legs to release the brake shoes from their respective wheels. For the purposes in view, traction of the vehicle herein shown is provided manually and the illustrative braking system is hand-controlled, a handle being detachably connected to the above-mentioned frame member at either end of the vehicle for both guiding it and applying or releasing its brakes. The illustrative construction is further such that this control handle, which occupies an intermediate position when the brake shoes are applied to their respective wheels in frictional braking relation, may be moved in either of two directions from said intermediate position to release the brake shoes. More particularly the handle may be moved heightwise of its inoperative or intermediate position to effect the tilting of the frame member which results in all of the brake shoes being rendered inoperative at substantially the same time. Advantageously the load-supporting legs, to which the brake shoes are adjustably affixed, are all moved upward substantially the same extent during the upward or downward movement of the handle to release the brake shoes, and consequently no adverse inclination is thereby imparted to the load-carrying body or platform supported by said legs. Upon releasing the handle during movement of the vehicle an operator thus permits the platform and its load automatically to act through the supporting legs to reapply the brake shoes and restore the equalizer members to their normal straightened or angular relationship.

Another feature, of particular value in a manually operable vehicle adapted to carry relatively heavy loads, is afforded in that as herein shown the novel construction is such that downward movement of the control handle beyond the extent required fully to release the brakes can no further tilt the frame member, but will bodily raise that pair of wheels remote from the handle thus facilitating tilting movement of the vehicle on its other or adjacent pair of wheels as is desired to aid in steering.

As a further feature the invention provides novel means for operatively connecting and disconnecting the control handle at either end of the frame member thus readily permitting the vehicle to be pushed or pulled by an operator positioned at an end thereof. Steering and braking may be accordingly exercised by a single member and in restricted operating spaces such as are found, for example, in elevators.

The above and other features of the invention, together with various novel combinations and arrangements of parts, will now be more particularly described in connection with an illustrative vehicle in which the invention is embodied and with reference to the accompanying drawings, in which Fig. 1 is a perspective view of a vehicle in which the invention is embodied, a load of bombs being shown on their adaptor as removably mounted on the vehicle merely by way of illustrating one use;

Fig. 2 is a bottom plan view, on a larger scale, of the vehicle shown in Fig. 1, portions being broken away to reveal details of construction;

Fig. 3 is a view in elevation and partly in section of a portion of the vehicle as viewed from an end thereof, a brake being shown as applied to one wheel;

Fig. 7 is a detail in perspective of parts shown in Fig. 2 by which a control handle is detachably mounted.

Figure 4:
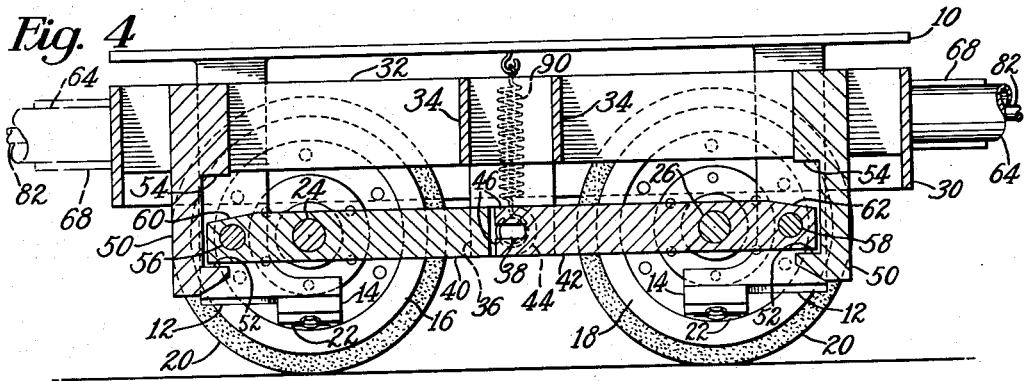
Fig. 4 is a view in side elevation and largely in section illustrating the vehicle in stationary condition with brakes applied.

The embodiment of the invention shown in the drawings and about to be described constitutes but one of many possible organizations in which various forms of my improved operating means might be employed, design factors in each case being predicated on such considerations, for example, as type of load to be carried, its weight, range of speed, type of power employed, etc. The relatively simple and rugged vehicle construction herein shown by way of example comprises a load supporting platform 10 mounted on four legs 12 each of which adjustably carries on its lower end a brake shoe 14, the brake shoes carried by the four legs being frictionally engageable with the inner rims of two pairs of wheels 16, 18. The four wheels are of similar construction and preferably are provided with rubber tires 20. As shown in Fig. 4, the horizontal platform 10 and any load thereon tend to force convexly curved braking surfaces 22 of the shoes 14 to bear on the said rims with pressure and thus hold the vehicle stationary or frictionally resist rotation of the wheels 16, 18. It will be understood that the shoes 14 may be mounted differently, if desired, the bearing on an internal rim being here preferred to avoid excessive wear on the rubber treads. The wheels 16, 16 are rotatably mounted on bearings one at each end of an axle 24, while the wheels 18, 18 are similarly mounted one at each end of an axle 26 parallel to the axle 24.

For the purpose of controlling the frictional brake relation of the shoes 14 with the four wheels 16, 18, a frame or body member 30 is supported for tilting movement about an axis A—A (Fig. 2) parallel to the axles 24, 26 and rectangularly encloses the vehicle to serve as a fender therefor. The structure by which the member 30 is supported will next be explained, and thereafter the way its tilting actuates the shoes 14 will be described. Integral with the member 30 are a pair of parallel reinforcing plates 32, 32 extending from one end of the vehicle to the other and another pair of parallel reinforcing plates 34, 34 extending from side to side of the vehicle. Brackets 36, 36 extending between the plates 34, 34 and secured thereto extend downwardly to provide bearings for alined fulcrum bars 38, 38 having an axis substantially coincident with the axis A—A. The bars 38, 38 constitute a fulcrum for the tiltable member 30. As herein shown an equalizer device is provided in the endwise arrangement of a lever 40 and a lever 42 preferably of substantially equal length. The levers 40, 42 are in the form of somewhat flat plates extending between the wheels 16, 18 respectively, the lever 40 being pivotally mounted intermediate its ends on the axle 24, and the lever 42 being pivotally mounted intermediate its ends on the axle 26 in a similar manner. For pivotally receiving the bars 38, 38 the lever 40 has oppositely disposed portions 44, 44 (Fig. 2) suitably bored, whereas the lever 42 has a centrally projecting bifurcated portion 46 adapted to receive the inner flatted ends of the bars 38, 38. It may be noted that the equalizer device 40, 42 (Fig. 4) is in straightened condition when the shoes 14 are applied in braking relation to the rims of the wheels and the frame 30 is then supported in a substantially horizontal position. The equalizer 40, 42 need not be in such straightened condition but may normally have an angular formation, the essential relation between the equalizer lever portions being such that an angular movement of one causes a substantially equal but opposite turning movement of the other.

The equalizer 40, 42, and hence the frame 30, is associated with the brake shoes 14, as will now be related. Secured to the opposite end portions of the plates 32, 32 are depending latch bars 50 each having inwardly extending flanges or shoulders 52, 54 (Figs. 3 and 4). The latch bars 50 are thus arranged to have their shoulders 52 respectively engageable with the undersides of the remote ends of the levers 40, 42. These remote ends of the levers 40, 42 are respectively bored widthwise pivotally to receive pins 56, 58 which respectively extend through bores formed in the oppositely disposed legs 12, 12. For a purpose hereinafter indicated, the remote ends of the levers 40, 42 have their respective upper surfaces 60, 62 beveled with opposite inclination.

Figure 8:
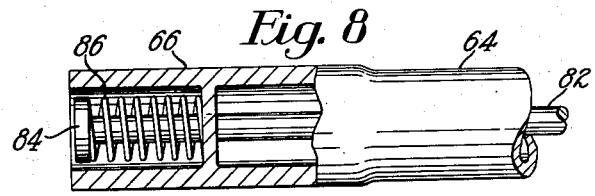
Fig. 8 is a detail in side elevation of one end of a control handle provided for maneuvering the vehicle.

Convenient means for moving the vehicle, steering it, and operating its brake system are afforded. Thus, in the illustrative conveyance, one or more readily detachable control levers 64 (Fig. 1) would be provided for maneuvering it manually. The lever 64 is preferably tubular and curved, having a handle 66 at an upper end and a rectangular slide 68 integral with its lower end. The latter is adapted to be received in a guideway formed in a bracket 70 (Figs. 2 and 7) secured to each corner portion of the member 30 and is provided with a hole 72 (Fig. 2) for receiving an end of a spring-pressed plunger 74 biased to extend therein. The plunger 74 may be retracted to unlatch the lever 64 from the vehicle by rocking a bell-crank lever 76 pivotally mounted on a housing 78 affixed to the member 30 and in which the plunger is nested, a forked end of the lever 76 straddling a pin 80 projecting from the plunger. The lever 76 is thus rocked by means of a rod 82 engageable endwise therewith and extending in the hand lever 64, a button 84 (Fig. 8) on the rod 82 being depressible in the handle 66 for this purpose against the resistance of a return spring 86.

Figure 1:
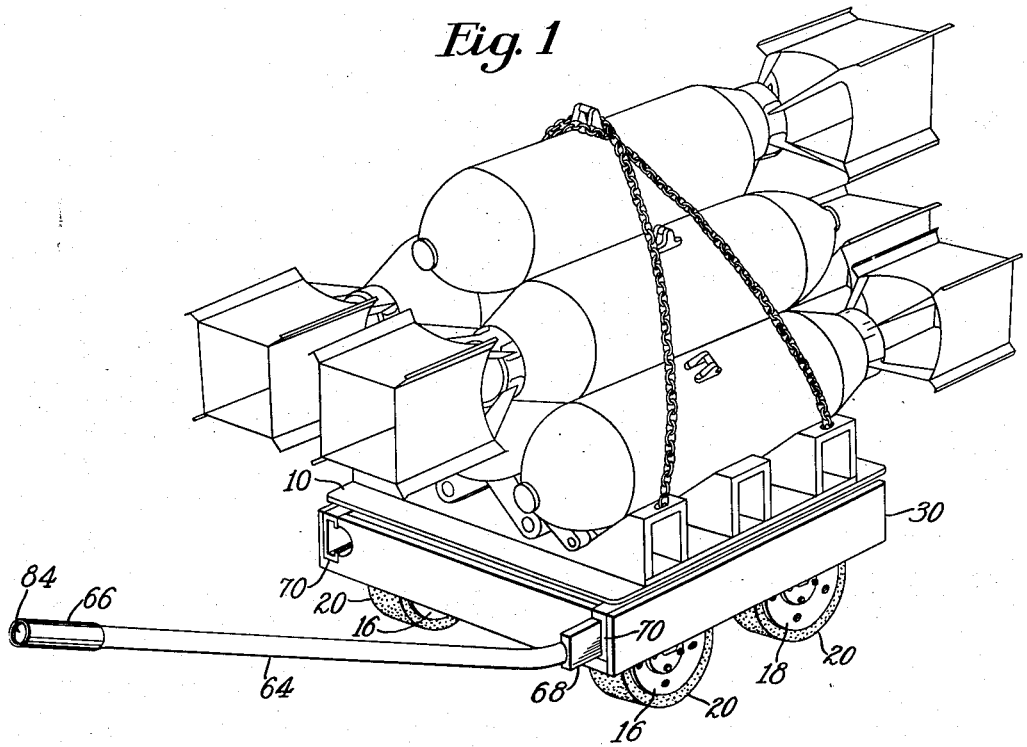
Figure 5:
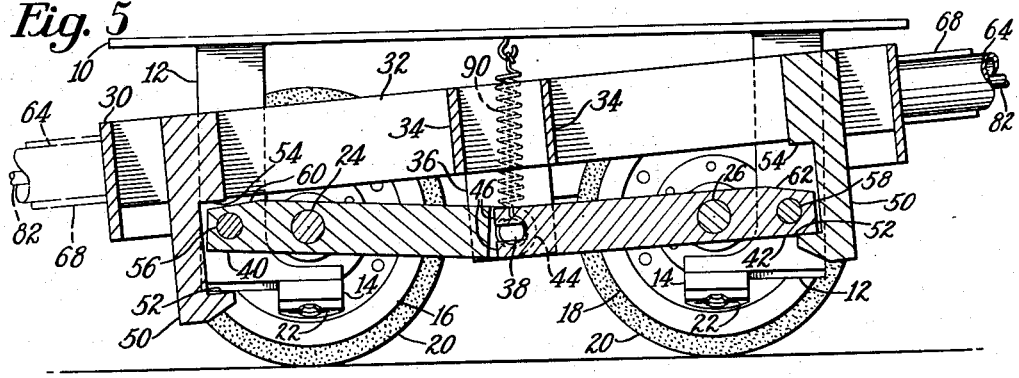
Fig. 5 is a view similar to Fig. 4 but illustrating the vehicle with its brakes released.
Figure 6:
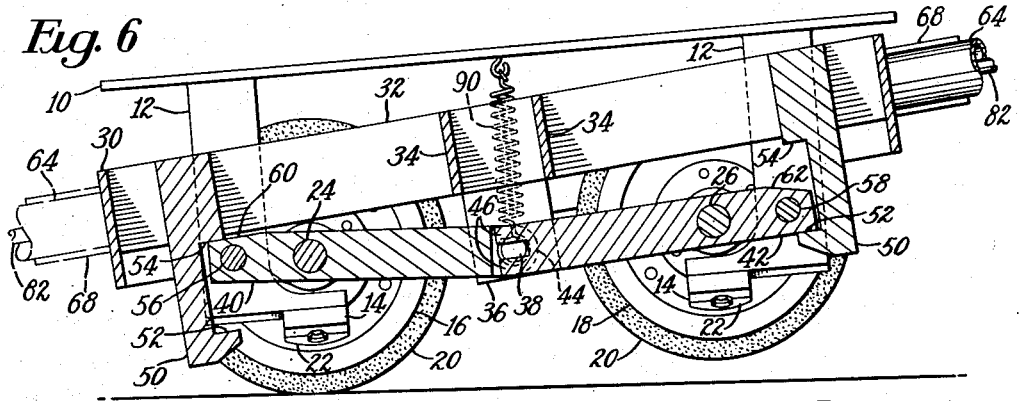
Fig. 6 is a view similar to Fig. 5 but illustrating the vehicle with a pair of its wheels raised to facilitate travel around curves and over obstacles.

In maneuvering it is frequently more convenient for an operator to grip with one hand the control lever 64, Fig. 1, the operator's other hand then bearing directly on the load. In other situations two levers 64 may be thrust into locking engagements with their respective brackets 70 at one end or the other of the vehicle for guiding it and applying or releasing its brakes. In any case, operation of the vehicle with one or more levers 64 and from either end is the same in principle. Assuming the vehicle shown in Fig. 4 is to be moved with its load (such as shown in Fig. 1 for example), the shoes 14 will first be simultaneously released from braking relation by lifting them from the internal rims of the wheels 16, 18. This is effected by either lifting or depressing a hand lever 64 from its normal intermediate heightwise position to tilt the frame member 30 about the axis A—A. As shown in Figs. 5 and 6, the lever 64 shown in solid lines has been raised to release the four shoes 14, or the lever 64 shown in phantom outline at the opposite end of the vehicle may be considered to have been depressed. It is important to note (Fig. 5) that the brake release being effected is not accompanied by any tilting of the load supporting platform 10. Lifting the lever 64 (full lines) to its position shown in Fig. 5 tilts the member 30 to raise the adjacent latch bar 50, its shoulder 52 engaging an end of the lever 42 to pivot it counterclockwise about its axle 26. In so doing, the pin 58 is caused to lift both of the adjacent brake carrying legs 12, and the alined fulcrum bars 38, 38 are thus caused to be depressed. The equalizer device 40, 42 is consequently actuated, the lever 40 being moved clockwise (as seen in Fig. 4 or 5) about the axle 24 to lift both of the other brake carrying legs 12 by an equal amount relatively to the internal rims of the wheels.

Having released the brake shoes, the vehicle may be moved by pushing or pulling on the lever 64 and, in guiding it around a corner or over an obstacle it may be desirable to maneuver the vehicle on just one pair of wheels 16 or 18. This is readily accomplished by further lifting (or further depressing) the same lever 64, as seen in Fig. 6. The resultant further tilting of the member 30 can continue only until the inclined surfaces 60 engage the shoulders 54 (or the surfaces 62 engage the other shoulders 54), whereupon, the equalizer 40, 42 being unable to be angularly actuated further, the wheels 18 (or 16) are lifted bodily and the entire vehicle must tilt.

Since a pair of control levers 64 may have considerable weight which might of itself tend to release the shoes 14 from braking position unless counterbalancing control levers 64 are also mounted in the other end of the vehicle, a pair of rather light tension springs 90 is provided to offset such tendency by yieldingly resisting the actuation of the equalizer 40, 42. For this purpose each of the fulcrum bars 38, 38 is connected by one of the springs 90 to the platform 10.

Release of the control lever 64 from its elevated or its depressed position permits the tilted frame member 30 again to become horizontal and the latch bars 50, 50 allow the pins 56, 58 to be lowered as the lever 64 assumes its normal intermediate position. The pins 56, 58 are thus quickly urged to be lowered by the weight of the load, if any, on the vehicle and of the platform 10 and the legs 12. The equalizer device 40, 42 accordingly resumes a more straightened condition in which the four shoe surfaces 22 are again in braking relation with the wheel rims.

From the above it will be appreciated that this invention affords convenient means for positively controlling a vehicle in motion and for automatically stopping its movement by so-called "dead man brakes" when control is no further exercised.

Having thus described my invention, what I claim as new and desire to secure by Letters Patent of the United States is:

1. In a vehicle having axle-mounted wheels and load-supporting legs for carrying brake shoes into and out of frictional braking relation therewith, a pair of equalizer levers each pivotally mounted intermediate its ends on one of the axles, the remote end portions of said levers respectively supporting one or more of said legs, and means for actuating the equalizer levers to move said brake shoes toward and from operative position relatively to the wheels.

2. In a vehicle having a pair of axles, wheels respectively mounted thereon, and load-supporting legs respectively extending to carry brake shoes into and out of braking relation with said wheels, an equalizer comprising a pair of levers each pivotally mounted intermediate its ends on one of the axles, the remote end portions of said levers being pivotally connected to at least one of said legs, and a member mounted for tilting movement about an axis intermediate said axles and substantially parallel thereto, said member being engageable with one of said levers to operate said equalizer and thereby to lift the brake shoes substantially simultaneously from braking relation with said wheels.

3. In a vehicle having a pair of axles, wheels respectively mounted thereon, and load-supporting legs respectively extending to carry brake shoes into and out of braking relation with said wheels, an equalizer device comprising a pair of levers each pivotally mounted intermediate its ends on one of the axles, the remote end portions of said levers being connected to said legs, a member mounted for tilting movement about an axis which is intermediate said axles and substantially parallel thereto, said member having a portion engageable with one of said remote lever end portions, and means for tilting said member to actuate said equalizer device to release said brake shoes.

4. In a four-wheeled vehicle, a pair of axles on which the wheels are mounted, a pair of levers in equalizer formation respectively mounted intermediate their ends on said axles, one or more load-supporting legs pivotally carried by the remote ends of said levers, brake shoes respectively actuated by said legs to and from frictional relation with said wheels, and means for pivoting said equalizer levers on their respective axles to cause said legs effectively to move the brake shoes radially relatively to the wheels, said means including a member pivotally supported for bearing on an end portion of one of said levers, and mechanism for tilting said member.

5. In a four-wheeled vehicle, a pair of axles on which the wheels are mounted, a pair of levers in equalizer formation respectively mounted intermediate their ends on said axles, one or more load-supporting legs carried by the remote end portions of said levers, brake shoes respectively actuated by said legs to and from frictional relation with said wheels, and means for oppositely pivoting said equalizer levers at substantially the same time on their respective axles to cause the legs effectively to move the brake shoes relatively to the wheels, said means including a member mounted for tilting movement about an axis intermediate said axles and adapted to engage the upper and lower surfaces of said remote ends of the equalizer levers, and mechanism operatively engageable with either end of said member for tilting it to release said brake shoes and to facilitate control of the vehicle in motion.

6. In a vehicle having a pair of axles and a pair of wheels mounted on each axle, a pair of levers in equalizer formation and respectively mounted intermediate their ends for relative angular movement, load-supporting legs pivotally mounted on the remote end portions of said equalizer levers, brake shoes respectively actuatable by said legs into and out of frictional relation with said wheels, said shoes being in frictional braking relation to the wheels when said equalizer formation assumes one angular relation, a member pivotally supported in relation to the equalizer formation and engageable with opposite surfaces on the remote end portions of said levers, and means for tilting the member to cause said equalizer formation to assume another angular relation and thereby release said brake shoes.

7. A vehicle as set forth in claim 6, further characterized in that said member constitutes a frame-like enclosure serving as a protective fender for the vehicle.

8. A vehicle as set forth in claim 6, further characterized in that said means constitutes one or more manually operable steering control levers detachably connected to said member for tilting it from either end thereof.

No references cited.